US012206165B2

(12) United States Patent
Hsu et al.

(10) Patent No.: US 12,206,165 B2
(45) Date of Patent: Jan. 21, 2025

(54) SEMICONDUCTOR DEVICE PACKAGE AND METHOD OF MANUFACTURING THE SAME

(71) Applicant: Advanced Semiconductor Engineering, Inc., Kaohsiung (TW)

(72) Inventors: Shao-En Hsu, Kaohsiung (TW); Huei-Shyong Cho, Kaohsiung (TW); Shih-Wen Lu, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 0 days.

(21) Appl. No.: 18/206,580

(22) Filed: Jun. 6, 2023

(65) Prior Publication Data

US 2023/0327333 A1 Oct. 12, 2023

Related U.S. Application Data

(63) Continuation of application No. 17/327,644, filed on May 21, 2021, now Pat. No. 11,670,846, which is a continuation of application No. 16/448,990, filed on Jun. 21, 2019, now Pat. No. 11,018,422.

(51) Int. Cl.

| | |
|---|---|
| ***H01Q 1/52*** | (2006.01) |
| ***H01Q 1/22*** | (2006.01) |
| ***H01Q 1/24*** | (2006.01) |
| ***H01Q 1/48*** | (2006.01) |
| ***H01Q 5/378*** | (2015.01) |
| ***H01Q 21/06*** | (2006.01) |

(52) U.S. Cl.
CPC ........... *H01Q 1/523* (2013.01); *H01Q 1/2283* (2013.01); *H01Q 1/243* (2013.01); *H01Q 1/48* (2013.01); *H01Q 5/378* (2015.01); *H01Q 21/061* (2013.01)

(58) Field of Classification Search
CPC ...... H01Q 1/523; H01Q 5/378; H01Q 1/2283; H01Q 1/243; H01Q 1/48; H01Q 21/061
See application file for complete search history.

(56) References Cited

U.S. PATENT DOCUMENTS 8,354,972 B2 1/2013 Borja et al.
9,806,422 B2 * 10/2017 Garcia ................ G06K 19/077
(Continued)

OTHER PUBLICATIONS

Non-Final Office Action for U.S. Appl. No. 17/327,644, issued Oct. 6, 2022, 9 pages.
(Continued)

*Primary Examiner* — Graham P Smith
(74) *Attorney, Agent, or Firm* — FOLEY & LARDNER LLP

(57) ABSTRACT

A semiconductor device package includes a substrate, a first antenna pattern and a second antenna pattern. The substrate has a first surface and a second surface opposite to the first surface. The first antenna pattern is disposed over the first surface of the substrate. The first antenna pattern has a first bandwidth. The second antenna pattern is disposed over the first antenna pattern. The second antenna pattern has a second bandwidth different from the first bandwidth. The first antenna pattern and the second antenna pattern are at least partially overlapping in a direction perpendicular to the first surface of the substrate.

20 Claims, 7 Drawing Sheets

(56) References Cited

U.S. PATENT DOCUMENTS

| | | | |
|---|---|---|---|
| 10,096,558 | B1 | 10/2018 | Chiang et al. |
| 2019/0020121 | A1* | 1/2019 | Paulotto ................. H01Q 21/28 |

OTHER PUBLICATIONS

Non-Final Office Action for U.S. Appl. No. 16/448,990, issued Oct. 6, 2020, 7 pages.
Notice of Allowance for U.S. Appl. No. 17/327,644, issued Feb. 1, 2023, 5 pages.
Notice of Allowance for U.S. Appl. No. 16/448,990, issued Jan. 26, 2021, 5 pages.

* cited by examiner

SEMICONDUCTOR DEVICE PACKAGE AND METHOD OF MANUFACTURING THE SAME

CROSS-REFERENCE TO RELATED APPLICATIONS

This application is a continuation of U.S. patent application Ser. No. 17/327,644 filed May 21, 2021, which is a continuation of U.S. patent application Ser. No. 16/448,990 filed Jun. 21, 2019, now U.S. Pat. No. 11,018,422, the contents of each of which are incorporated herein by reference in their entireties.

BACKGROUND

1. Technical Field

The present disclosure relates to a semiconductor device package and a method of manufacturing the same, and to a semiconductor device package including an antenna and a method of manufacturing the same.

2. Description of the Related Art

Wireless communication devices, such as cell phones, typically include antennas for transmitting and receiving radio frequency (RF) signals. In recent years, with the continuous development of mobile communication and the pressing demand for high data rate and stable communication quality, relatively high frequency wireless transmission (e.g., 28 GHz or 60 GHz) has become one of the most important topics in the mobile communication industry. However, signal attenuation and inference are some of the problems at relatively high frequency (or relatively short wavelength) wireless transmission.

SUMMARY

In accordance with some embodiments of the present disclosure, a semiconductor device package includes a substrate, a first antenna pattern and a second antenna pattern. The substrate has a first surface and a second surface opposite to the first surface. The first antenna pattern is disposed over the first surface of the substrate. The first antenna pattern has a first bandwidth. The second antenna pattern is disposed over the first antenna pattern. The second antenna pattern has a second bandwidth different from the first bandwidth. The first antenna pattern and the second antenna pattern are at least partially overlapping in a direction perpendicular to the first surface of the substrate.

In accordance with some embodiments of the present disclosure, a semiconductor device package includes a substrate, a first antenna pattern and a second antenna pattern. The substrate has a first surface and a second surface opposite to the first surface. The first antenna pattern is disposed over the first surface of the substrate. The first antenna pattern has a feeding point. The second antenna pattern is disposed over the first antenna pattern. The second antenna pattern has a feeding point. The feeding point of the first antenna pattern is coupled to the feeding point of the second antenna pattern.

Figure 1A:
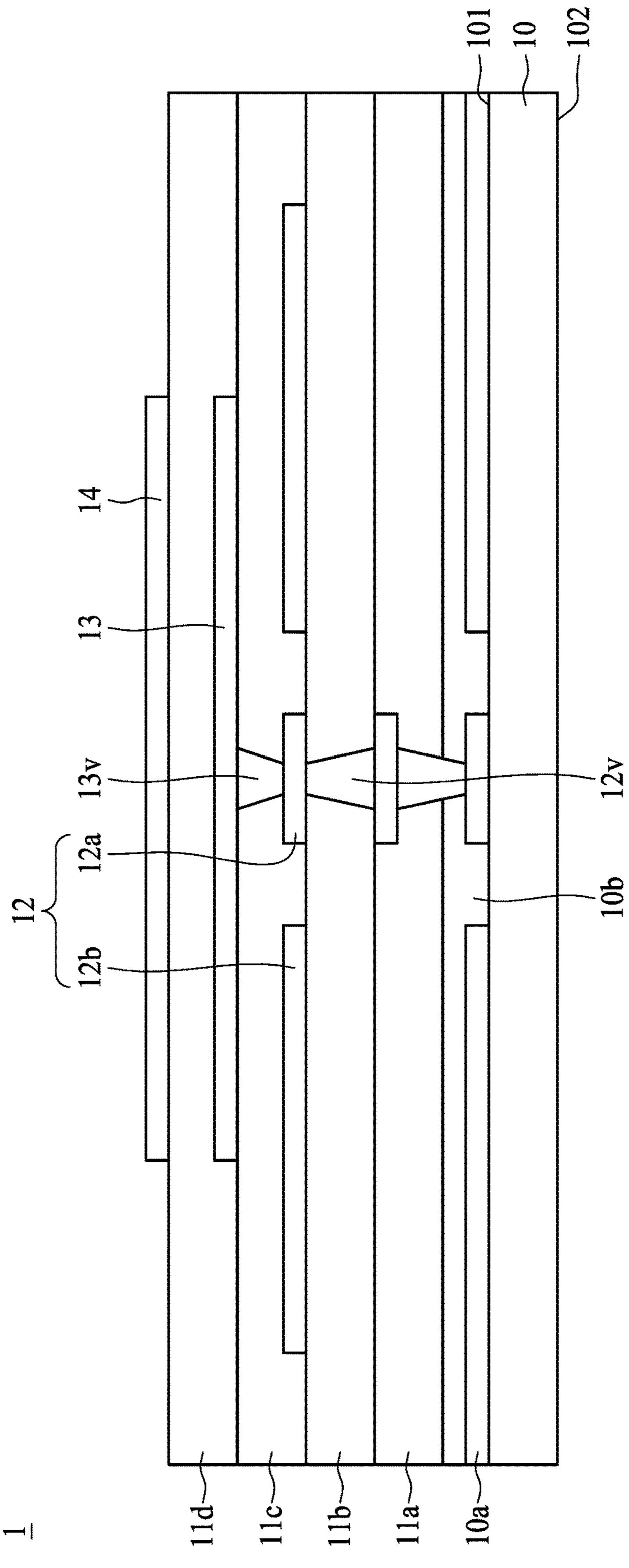
FIG. 1A illustrates a cross-sectional view of a semiconductor device package in accordance with some embodiments of the present disclosure.

Common reference numerals are used throughout the drawings and the detailed description to indicate the same or similar components. The present disclosure will be readily understood from the following detailed description taken in conjunction with the accompanying drawings.

DETAILED DESCRIPTION

Figure 1B:
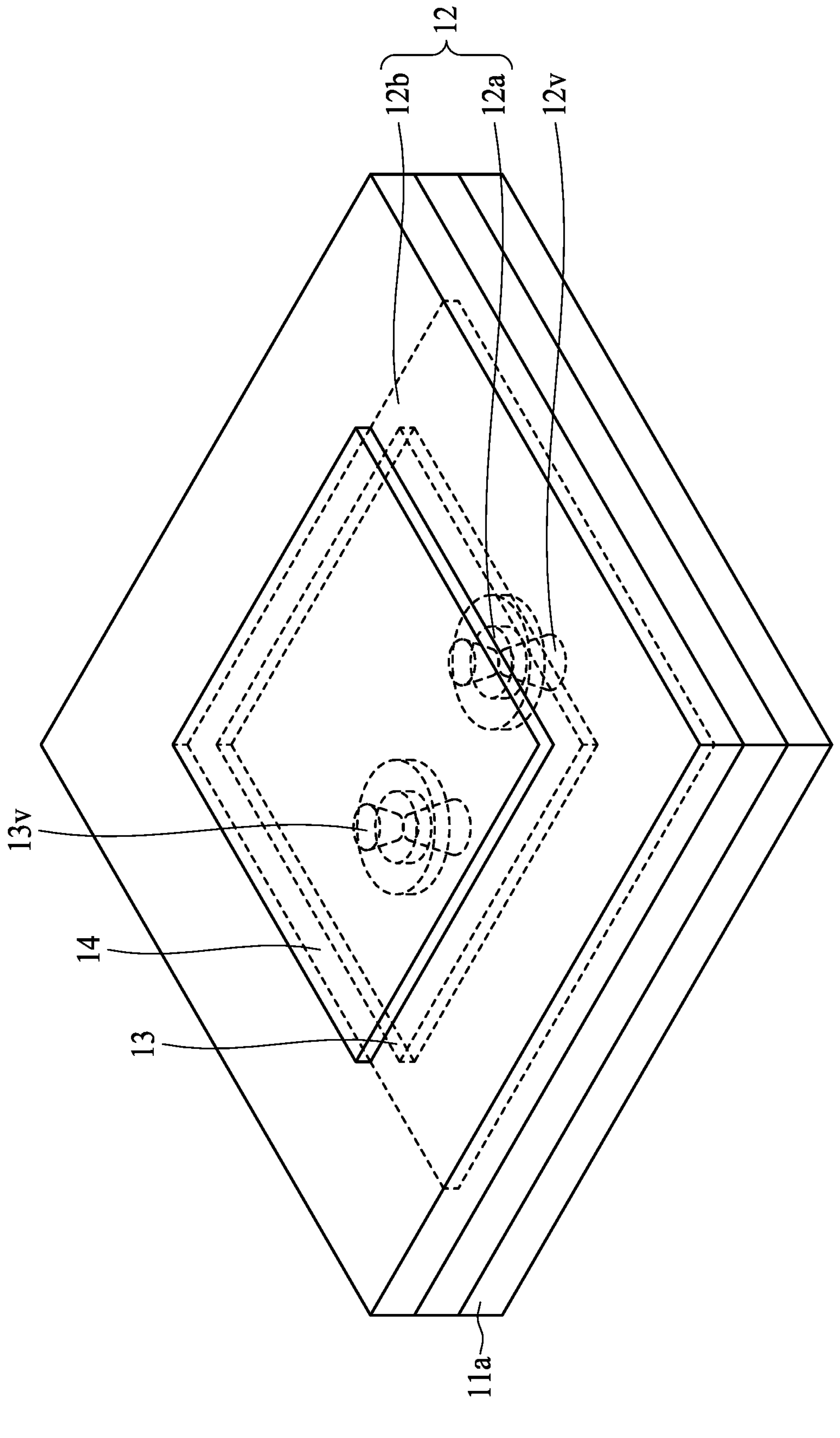
FIG. 1B illustrates a perspective view of a semiconductor device package in accordance with some embodiments of the present disclosure.

FIG. 1A illustrates a top view of a semiconductor device package 1 in accordance with some embodiments of the present disclosure. FIG. 1B illustrates a perspective view of the semiconductor device package 1 illustrated in FIG. 1A in accordance with some embodiments of the present disclosure (for clarity, some of the components in FIG. 1A are omitted in FIG. 1B). The semiconductor device package 1 includes a substrate 10, dielectric layers 11*a*, 11*b*, 11*c* and 11*d*, antenna patterns 12, 13 and 14.

The substrate 10 may be, for example, a printed circuit board, such as a paper-based copper foil laminate, a composite copper foil laminate, or a polymer-impregnated glass-fiber-based copper foil laminate. The substrate 10 may include an interconnection structure (or electrical connection), such as a redistribution layer (RDL) or a grounding element. The substrate 10 has a surface 101 and a surface 102 opposite to the surface 101. In some embodiments, one or more electronic components (not shown in the drawing) are disposed on the surface 102 of the substrate 10 and electrically connected to the substrate 10. In some embodiments, the electronic components may be active electronic components, such as integrated circuit (IC) chips or dies. The electronic components may be electrically connected to the substrate 10 (e.g., to the RDL) by way of flip-chip or wire-bond techniques.

A conductive layer 10*a* is disposed on the surface 101 of the substrate 10. In some embodiments, the conductive layer 10*a* is formed of or includes gold (Au), silver (Ag), aluminum (Al), copper (Cu), or an alloy thereof. In some embodiments, the conductive layer 10*a* acts as a ground layer or a RF layer for the antenna pattern 12, 13 or 14. An isolation layer 10*b* (e.g., solder mask or solder resist) is disposed on the surface 101 of the substrate 10 to protect the conductive layer 10*a*.

The dielectric layers 11*a*, 11*b*, 11*c* and 11*d* are arranged in a stacked structure. For example, as shown in FIG. 1A, the dielectric layer 11*a* is disposed on the isolation layer 10*b*, the dielectric layer 11*b* is disposed on the dielectric layer 11*a*, the dielectric layer 11*c* is disposed on the dielectric layer 11*b*, and the dielectric layer 11*d* is disposed on the dielectric layer 11*c*. In some embodiments, the dielectric layer 11*a* and

11*b* are used to increase a distance (e.g., a clearance area) between the antenna pattern 12 and the conductive layer 10*a* (e.g., ground plane or RF plane), which would improve the performance of the antenna pattern 12. In some embodiments, the number of the dielectric layers can be adjusted depending on different specifications.

In some embodiments, the dielectric layers 11*a*, 11*b*, 11*c* and 11*d* may include molding compounds, pre-impregnated composite fibers (e.g., pre-preg), Borophosphosilicate Glass (BPSG), silicon oxide, silicon nitride, silicon oxynitride, Undoped Silicate Glass (USG), any combination thereof, or the like. Examples of molding compounds may include, but are not limited to, an epoxy resin including fillers dispersed therein. Examples of a pre-preg may include, but are not limited to, a multi-layer structure formed by stacking or laminating a number of pre-impregnated materials/sheets. The dielectric layers 11*a*, 11*b*, 11*c* and 11*d* may include the same or different materials depending on different specifications.

The antenna pattern 12 is disposed on the dielectric layer 11*b* and covered by the dielectric layer 11*c*. In some embodiments, as shown in FIG. 1A and FIG. 1B, the antenna pattern 12 has a portion 12*a* and a portion 12*b*. The portion 12*a* is electrically connected to the conductive layer 10*a* through a conductive via 12*v*. In some embodiments, the portion 12*a* acts as a feeding point of the antenna pattern 12. For example, the portion 12*a* is arranged to transmit or receive signal from the conductive layer 10*a* through the conductive via 12*v*. The portion 12*b* is spaced apart from the portion 12*a*. For example, there is a gap between the portion 12*a* and the portion 12*b*. In some embodiments, the portion 12*b* may surround the portion 12*a*. In some embodiments, the signal transmission between the portion 12*a* and the portion 12*b* may be achieved by coupling. In some embodiments, the antenna pattern 12 is, or includes, a conductive material such as a metal or metal alloy. Examples of the conductive material include Au, Ag, Al, Cu, or an alloy thereof.

Figure 4:
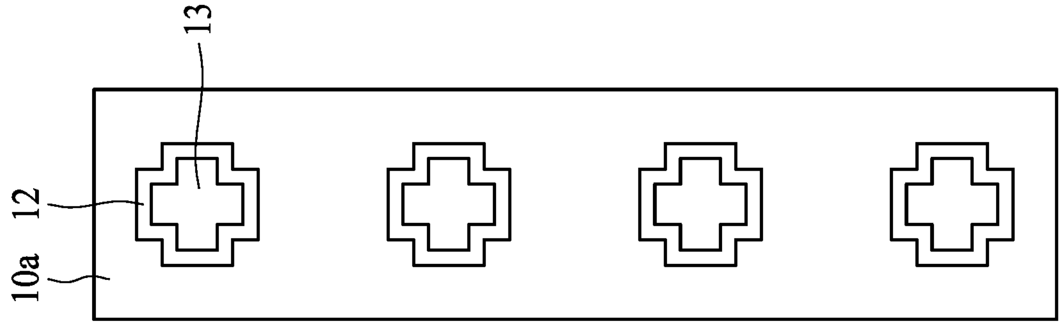
FIG. 4 illustrates a top view of a semiconductor device package in accordance with some embodiments of the present disclosure.
Figure 5:
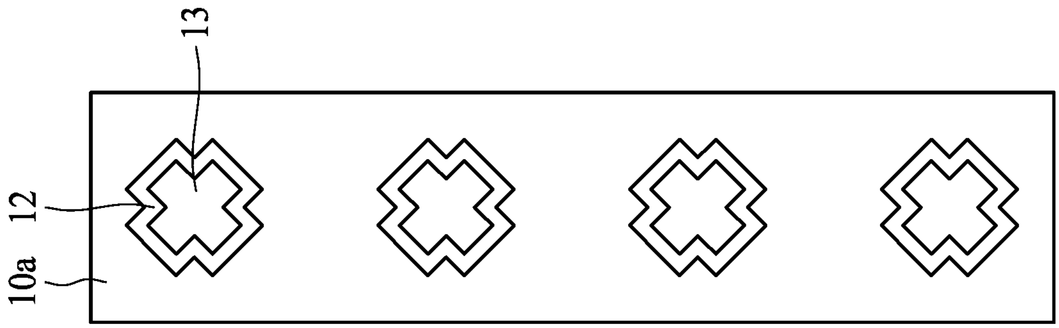
FIG. 5 illustrates a top view of a semiconductor device package in accordance with some embodiments of the present disclosure.
Figure 6:
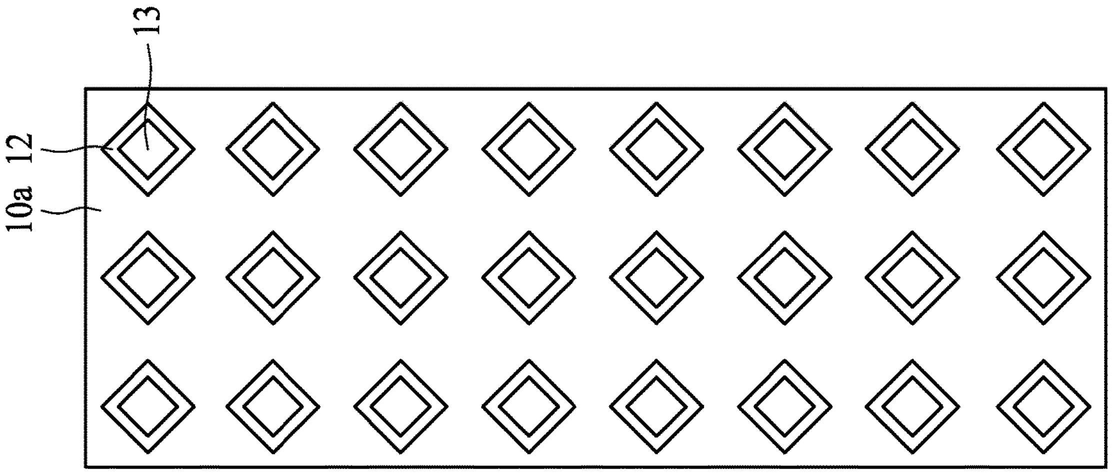
FIG. 6 illustrates a top view of a semiconductor device package in accordance with some embodiments of the present disclosure.

In some embodiments, the antenna pattern 12 may include a single antenna element. In some embodiments, the antenna pattern 12 may include multiple antenna elements. For example, the antenna pattern 12 may include an array including patch antennas. In some embodiments, the antenna pattern 12 may include an M×N array of antenna elements, where M or N is an integer greater than 1. In some embodiments, M can be the same as or different from N depending on design specifications. For example, as shown in FIGS. 2-5, which illustrate top views of the semiconductor device package 1 in various embodiments (for clarity, some of the components of the semiconductor device package 1 are omitted, such as the antenna pattern 14, dielectric layers 11*a*, 11*b*, 11*c*, 11*d* and the substrate 10), the antenna pattern 12 may include a 1×4 array of antenna elements. For example, as shown in FIG. 6, which illustrate a top view of the semiconductor device package 1 in some embodiments, the antenna pattern 12 may include a 3×8 array of antenna elements. In some embodiments, the antenna pattern 12 is or includes a patch antenna or a patch antenna array operating in a frequency of 28 GHz. For example, a bandwidth of the antenna pattern 12 is in a range from about 27.5 GHz to about 28.35 GHz.

As shown in FIG. 1A and FIG. 1B, the antenna pattern 13 is disposed on the dielectric layer 11*c* and covered by the dielectric layer 11*d*. The antenna pattern 13 is electrically connected to the portion 12*a* of the antenna pattern 12 through a conductive via 13*v*. For example, the signal transmission between the antenna pattern 12 and the antenna pattern 13 may be achieved by the direct feed. In other embodiments, the signal transmission between the antenna pattern 12 and the antenna pattern 13 may be achieved by magnetically coupling. In some embodiments, the antenna pattern 13 is, or includes, a conductive material such as a metal or metal alloy. Examples of the conductive material include Au, Ag, Al, Cu, or an alloy thereof.

In some embodiments, the antenna pattern 13 is disposed over the antenna pattern 12, and the number, the location and the shape of the antenna pattern 13 may be corresponding to those of the antenna pattern 12. For example, as shown in FIGS. 2-5, the antenna pattern 13 may include a 1×4 array of antenna elements located corresponding to the antenna pattern 12. For example, as shown in FIG. 6, the antenna pattern 12 may include a 3×8 array of antenna elements located corresponding to the antenna pattern 12. In some embodiments, the antenna pattern 13 is or includes a patch antenna or a patch antenna array operating in a frequency of 38 GHz. For example, a bandwidth of the antenna pattern 13 is in a range from about 37 GHz to about 40 GHz.

As shown in FIG. 1A and FIG. 1B, the antenna pattern 14 is disposed on the dielectric layer 11*d* and may be covered by a protection layer (now shown). The antenna pattern 14 is spaced apart from the antenna pattern 13 and is coupled to the antenna pattern 13 for signal transmission therebetween. For example, the signal transmission between the antenna pattern 13 and the antenna pattern 14 may be achieved by coupling. In some embodiments, the antenna pattern 14 is, or includes, a conductive material such as a metal or metal alloy. Examples of the conductive material include Au, Ag, Al, Cu, or an alloy thereof.

In some embodiments, the antenna pattern 14 is disposed over the antenna pattern 13, and the number and the location of the antenna pattern 14 correspond to those of the antenna pattern 13. In some embodiments, the area of the antenna pattern 14 is substantially the same as that of the antenna pattern 13. In some embodiments, the area of the antenna pattern 14 may be greater or less than that of the antenna pattern 13 depending on different specifications. In some embodiments, the antenna pattern 14 is or includes a patch antenna or a patch antenna array operating in a frequency of 38 GHz. For example, a bandwidth of the antenna pattern 14 is in a range from about 37 GHz to about 40 GHz. By stacking two antenna patterns (e.g., the antenna patterns 13 and 14) with the same or similar bandwidth, the bandwidth can further increase.

To increase a bandwidth and a stability of the transmission rate of a wireless device, a dual-band (or multi-band) antenna module having two (or more) antennas with different operating bandwidths can be implemented. In some embodiments, the dual-band antenna module may include a one antenna (e.g., a dual-polarization patch antenna) having a first bandwidth (e.g., 28 GHz) and the other antenna (e.g., another dual-polarization patch antenna) having a second bandwidth (e.g., 38 GHz) arranged alternatively in the same plane or level. However, the polarized wave/radiation (e.g., magnetic field and/or electric field) emitted by one antenna may pass through the other antenna, which would adversely affect the performance of the other antenna, and vice versa.

Figure 2:
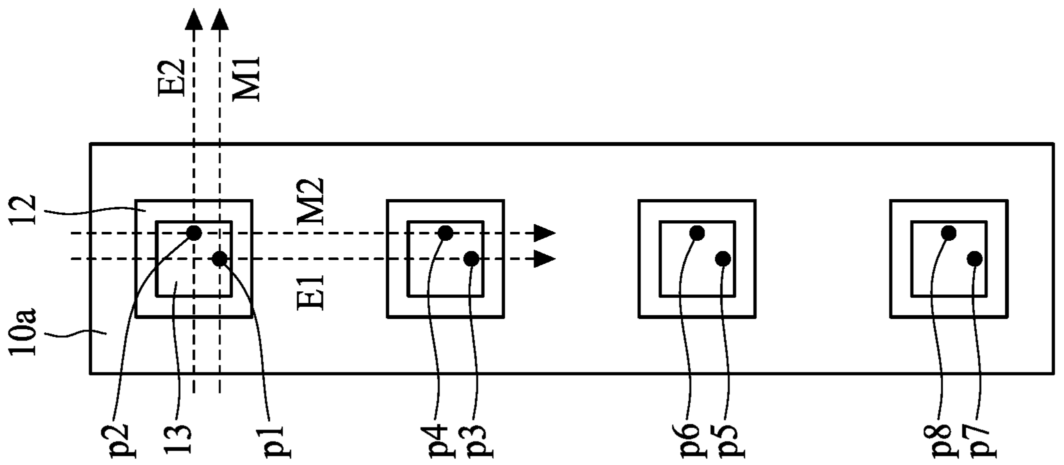
FIG. 2 illustrates a top view of a semiconductor device package in accordance with some embodiments of the present disclosure.

In accordance with the embodiments as shown in FIGS. 1A and 1B, the antenna pattern 13 is disposed over the antenna pattern 12. For example, the antenna pattern 13 and the antenna pattern 12 are disposed on different planes or levels. Hence, the polarized wave/radiation (e.g., magnetic field and/or electric field) emitted by the antenna pattern 13 would not pass through the antenna pattern 12, and vice versa. For example, as shown in FIG. 2, the antenna pattern 12 or 13 include a 1×4 array of patch antennas, each has a pair of polarized ports (e.g., "p1 and p2," "p3 and p4," "p5 and p6," "p7 and p8"). Take the topmost patch antenna for an example, the port p1 would generate two polarized radiations/waves, such as a magnetic field) M1 and an electric field E1 (the magnetic field M1 and the electric field E1 are orthogonal). Similarly, the port p2 would also generate two polarized radiations/waves, such as a magnetic field M2 and an electric field E2 (the magnetic field M1 and the electric field E1 are orthogonal). As shown in FIG. 2, the magnetic field M1 and the magnetic field M2 are orthogonal, and the electric field M1 and the electric field M2 are orthogonal. If the antenna patterns 12 and 13 are arranged alternatively on the same plane or level, the polarized radiation M2 generated by the antenna pattern 13 (e.g., the port p2 of the antenna pattern 13) and/or the polarized radiation E1 generated by the antenna pattern 13 (e.g., the port p1 of the antenna pattern 13) would pass through the antenna pattern 12, which would adversely affect the performance of the antenna pattern 12, and vice versa. As shown in FIG. 2, since the antenna pattern 13 and the antenna pattern 12 are disposed on different planes or levels, the polarized wave M2 or E1 emitted by the topmost patch antenna selectively passes through the patch antennas having the same bandwidth (e.g., other patch antennas of the antenna pattern 13), but would not pass through the patch antennas having different bandwidth (e.g., the patch antennas of the antenna pattern 12), and vice versa. This would avoid the interference between the antenna patterns 12 and 13, and improve the performance of the antenna patterns 12 and 13.

Figure 3:
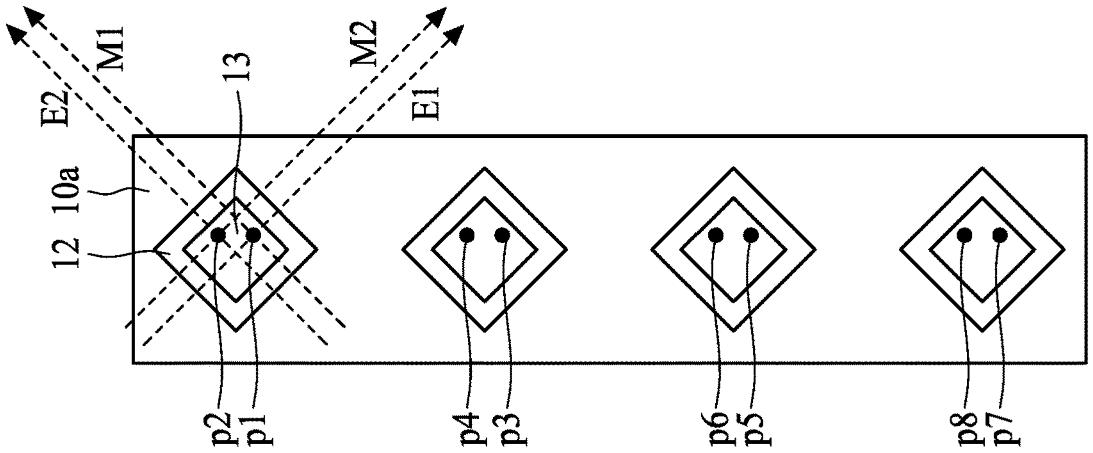
FIG. 3 illustrates a top view of a semiconductor device package in accordance with some embodiments of the present disclosure.

The structure illustrated in FIG. 3 is similar to that in FIG. 2, except that in FIG. 3, the antenna patterns 12 and 13 rotate counterclockwise by 45°. As shown in FIG. 3, both the polarized radiations E1, E2, M1 and M2 generated by the topmost patch antenna would not pass through either the patch antennas having different bandwidth (e.g., the patch antennas of the antenna pattern 12) or the patch antennas having the same bandwidth (e.g., other patch antennas of the antenna pattern 13). Therefore, the inference can be further eliminated or reduced, which would increase the gain of the antenna patterns 12 and 13.

In some embodiments, the antenna pattern 12 or 13 may have different shapes. For example, as shown in FIG. 2, the antenna pattern 12 or 13 is rectangular. For example, as shown in FIGS. 3 and 6, the antenna pattern 12 or 13 may be shaped like a rhombus. For example, as shown in FIG. 4, the antenna pattern 12 or 13 may be shaped like a cross. For example, as shown in FIG. 5, the antenna pattern 12 or 13 may be shaped like an "X". The shapes of the antenna patterns 12 and 13 can be changed or adjusted depending on different design specifications. For example, the antenna patterns 12 and 13 can be shaped like a polygon having N edges (or sides), where N is an integer equal to or greater than 3.

As used herein, the terms "substantially," "substantial," "approximately," and "about" are used to denote and account for small variations. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. As another example, a thickness of a film or a layer being "substantially uniform" can refer to a standard deviation of less than or equal to ±10% of an average thickness of the film or the layer, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. The term "substantially coplanar" can refer to two surfaces within micrometers of lying along a same plane, such as within 40 within 30 within 20 within 10 or within 1 μm of lying along the same plane. Two surfaces or components can be deemed to be "substantially perpendicular" if an angle therebetween is, for example, 90°±10°, such as ±5°, ±4°, ±3°, ±2°, ±1°, ±0.5°, ±0.1°, or ±0.05°. When used in conjunction with an event or circumstance, the terms "substantially," "substantial," "approximately," and "about" can refer to instances in which the event or circumstance occurs precisely, as well as instances in which the event or circumstance occurs to a close approximation.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately 104 S/m, such as at least 105 S/m or at least 106 S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It can be understood that such range formats are used for convenience and brevity, and should be understood flexibly to include not only numerical values explicitly specified as limits of a range, but also all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It can be clearly understood by those skilled in the art that various changes may be made, and equivalent elements may be substituted within the embodiments without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and such. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. A semiconductor device package comprising:

a first antenna comprising a first portion and a second portion spaced apart from and electrically coupled to the first portion for signal transmission, wherein a thickness of the first portion is substantially the same as a thickness of the second portion in a cross-sectional view perspective;

a second antenna disposed over the first antenna; and a third antenna disposed over the second antenna and configured to electrically couple to the second antenna.

2. A semiconductor device package comprising:

a first dual-polarization antenna configured for operating in a first frequency; and a second dual-polarization antenna disposed at least partially over the first dual-polarization antenna and configured for operating in a second frequency different from the first frequency, wherein the first dual-polarization antenna or the second dual-polarization antenna comprises a 1×N array of patch antennas, N being an integer equal to or greater than 4, each of the patch antennas comprises a first polarized port and a second polarized port, at least four of the first polarized ports are arranged along a first straight line, and an arrangement of the first polarized ports is substantially parallel to an arrangement of the second polarized ports.

3. The semiconductor device package as claimed in claim 2, further comprising a dielectric layer adjacent to the first dual-polarization antenna, wherein the first dual-polarization antenna has a first edge and a second edge non-parallel to the first edge, the dielectric layer has a third edge and a fourth edge non-parallel to the third edge; and wherein from a top view perspective, the first edge is substantially parallel to the third edge, and the second edge is substantially parallel to the fourth edge.

4. The semiconductor device package as claimed in claim 2, further comprising a ground layer having a first edge and a second edge non-parallel to the first edge, wherein an extension line of an edge of the first dual-polarization antenna interests the first edge and the second edge of the ground layer from a top view perspective.

5. A semiconductor device package comprising:

a first antenna pattern configured for operating in a first frequency and comprising a first patch antenna and a second patch antenna; and a second antenna pattern disposed over the first antenna pattern and configured for operating in a second frequency different from the first frequency, wherein the first antenna pattern and the second antenna pattern are geometrically distinct from each other from a top view perspective, wherein an extension line of a first diagonal line of the first patch antenna overlaps an extension line of a second diagonal line of the second patch antenna from the top view perspective.

6. The semiconductor device package of claim 1, wherein the first antenna further comprises a third portion spaced apart from and electrically coupled to the first portion for signal transmission, the first portion being disposed between the second portion and the third portion, and a thickness of the third portion is substantially the same as the thickness of the first portion in the cross-sectional view perspective.

7. The semiconductor device package of claim 6, further comprising a conductive via disposed under and directly connected to the first portion of the first antenna, wherein the conductive via and a portion of a lower surface of the first portion of the first antenna is exposed by the conductive via in the cross-sectional view perspective.

8. The semiconductor device package of claim 1, further comprising a conductive structure disposed under and directly connected to a bottom surface of the first portion of the first antenna, wherein at least a portion of a sidewall of the conductive structure is non-perpendicular to the bottom surface of the first portion of the first antenna.

9. The semiconductor device package of claim 8, wherein the conductive structure comprises a plurality of conductive vias stacked and connected to each other.

10. The semiconductor device package of claim 1, further comprising a conductive layer disposed under the first antenna, wherein the conductive layer comprises a first part and a second part spaced apart from the first part, a thickness of the first part is substantially the same as a thickness of the second part in the cross-sectional view perspective, and the first part is electrically connected to the first portion of the first antenna.

11. The semiconductor device package of claim 10, further comprising a conductive via electrically connecting the first part of the conductive layer to the first portion of the first antenna.

12. The semiconductor device package of claim 11, wherein a width of the conductive via is non-uniform in a direction from the third antenna toward the conductive layer.

13. The semiconductor device package of claim 10, wherein the conductive layer further comprises a third part spaced apart from the first part in the cross-sectional view perspective, the first part is disposed between the second part and the third part, and a thickness of the third part is substantially the same as the thickness of the first part and the thickness of the second part in the cross-sectional view perspective.

14. The semiconductor device package of claim 1, wherein a distance between the first antenna and the second antenna is not less than a distance between the second antenna and the third antenna.

15. The semiconductor device package of claim 1, further comprising a conductive via disposed under and directly connected to the first portion of the first antenna, wherein a width of the conductive via is greater than a thickness of the third antenna in the cross-sectional view perspective.

16. The semiconductor device package of claim 2, wherein at least four of the second polarized ports are arranged along a second straight line substantially parallel to the first straight line.

17. The semiconductor device package of claim 16, wherein the first straight line overlaps the second straight line from a top view perspective.

18. The semiconductor device package of claim 16, wherein the first straight line is free from intersecting the second straight line.

19. The semiconductor device package of claim 5, wherein the first antenna pattern further comprises a third patch antenna having a third diagonal line and a fourth patch antenna having a fourth diagonal line, and an extension line of the fourth diagonal line overlap an extension line of the third diagonal line, the extension line of the second diagonal line, and the extension line of the first diagonal line.

20. The semiconductor device package of claim 5, wherein the first patch antenna comprises a first polarized port and a second polarized port free from overlapping the first diagonal line of the first patch antenna.

* * * * *